US011080613B1

(12) United States Patent
Camara et al.

(10) Patent No.: US 11,080,613 B1
(45) Date of Patent: *Aug. 3, 2021

(54) PROCESS MONITORING BASED ON LARGE-SCALE COMBINATION OF TIME SERIES DATA

(71) Applicant: EMC IP Holding Company LLC, Hopkinton, MA (US)

(72) Inventors: Mauricio Melo Camara, Rio de Janeiro (BR); Angelo E. M. Ciarlini, Rio de Janeiro (BR); Jonas F. Dias, Rio de Janeiro (BR); André Maximo, Rio de Janeiro (BR); José Carlos Costa da Silva Pinto, Rio de Janeiro (BR); Monica Barros, Rio de Janeiro (BR); Rafael Marinho Soares, Rio de Janeiro (BR); Thiago de Sa Feital, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1012 days.

This patent is subject to a terminal disclaimer.

(21) Appl. No.: 15/141,981

(22) Filed: Apr. 29, 2016

(51) Int. Cl.
*G06F 15/18* (2006.01)
*G06N 7/00* (2006.01)
*G06N 20/00* (2019.01)

(52) U.S. Cl.
CPC ............ *G06N 7/005* (2013.01); *G06N 20/00* (2019.01)

(58) Field of Classification Search
CPC ................... G06N 5/00–48; G06N 7/00–08
(Continued)

(56) References Cited

U.S. PATENT DOCUMENTS 6,735,580 B1 * 5/2004 Li .......................... G06N 3/049
706/21
9,336,484 B1 * 5/2016 Iverson ............... G06F 16/2462
(Continued)

OTHER PUBLICATIONS

Taiwo and Olatayo, "Measuring Forecasting Performance of Vector Autoregressive and Time Series Regression Models", 2013, American Journal of Scientific and Industrial Research.*
(Continued)

*Primary Examiner* — Jue Louie
(74) *Attorney, Agent, or Firm* — Ryan, Mason & Lewis, LLP

(57) ABSTRACT

Methods and apparatus are provided for process monitoring based on large-scale combinations of time series data. An exemplary method comprises generating a model from time series data for a given target time series; determining whether a first difference between measured values and predicted values based on the model exceeds a predefined threshold indicating a target prediction error; in response to a detected target prediction error, performing evaluations of (i) a neighborhood coherence comprising an average of variables of the model weighted by corresponding coefficients on a predefined neighborhood time window, and/or (ii) a second difference between a given value of at least one variable in the model and an average value of the at least one variable based on a training dataset; providing notifications when first predefined criteria based on the evaluations are satisfied; and updating the model when second predefined criteria based on the evaluations are satisfied.

20 Claims, 5 Drawing Sheets

(58) Field of Classification Search
USPC .................................................. 706/12, 45–62
See application file for complete search history.

(56) References Cited

U.S. PATENT DOCUMENTS

| | | | |
|---|---|---|---|
| 2007/0005266 A1* | 1/2007 | Blevins .................. | G05B 17/02 |
| | | | 702/22 |
| 2009/0106178 A1* | 4/2009 | Chu ....................... | G06N 20/00 |
| | | | 706/14 |
| 2014/0250153 A1* | 9/2014 | Nixon .................... | G05B 15/02 |
| | | | 707/812 |
| 2015/0302318 A1* | 10/2015 | Chen ...................... | G06N 20/00 |
| | | | 706/12 |
| 2017/0103148 A1* | 4/2017 | Natsumeda ............ | G05B 17/02 |
| 2017/0109395 A1* | 4/2017 | Farah ..................... | G06Q 50/02 |
| 2017/0116530 A1* | 4/2017 | Modarresi ............. | G06Q 10/067 |

OTHER PUBLICATIONS

"The Concise Encyclopedia of Statics", 2008, Springer, section "Weighted Arithmetic Mean."*

Yu et al. "Time Series Outlier Detection Based on Sliding Window Prediction", 2014, Mathematical Problems in Engineering.*

Pati et al., "Orthogonal matching pursuit: recursive function approximation with applications to wavelet decomposition", In Proceedings of 27th Asilomar Conference on Signals, Systems and Computers, pp. 40-44. Pacific Grove, CA: IEEE Comput. Soc. Press. doi: 10.1109/ACSSC. 1993.

U.S. Appl. No. 15/078,224, filed Mar. 23, 2016, "Massively Parallel Processing (MPP) Large-Scale Combination of Time Series Data".

* cited by examiner

| $x_{j-k,0}$ | ... | $x_{j,0}$ | ... | $x_{j+k,0}$ |
|---|---|---|---|---|
| ⋮ | | ⋮ | | ⋮ |
| $x_{j-k,NJ-1}$ | ... | $x_{j,NJ-1}$ | ... | $x_{j+k,NJ-1}$ |

↗ 200

PROCESS MONITORING BASED ON LARGE-SCALE COMBINATION OF TIME SERIES DATA

FIELD

The field relates generally to techniques for monitoring industrial processes based on multivariate statistical models generated from time series that explain a target time series in specific situations.

BACKGROUND

In large scale industrial processes, multiple time series are often continuously collected by various sensors. The Internet-of-Things (IoT) is a network of physical objects, such as devices and sensors, that enables the physical objects to collect and exchange data. The IoT has contributed to the growth of the number of sensors and the corresponding amount of data generated by the sensors in residential and industrial environments. By collecting data generated from the sensors, a large number of time series data tends to be available for processing. An objective of a time series analysis is to explain the behavior of a time series using past values of the time series. In a multivariate setting, a time series is explained by its own past values, as well as the past and present values of other series of interest.

In order to save costs, it is important to find ways to analyze relevant information that suggests problems that can hinder or jeopardize the operation of an industrial plant. One challenge is that the creation of prediction models must consider an exponential number of combinations of variables. Any of the time series, in any possible time lag, is considered a distinct variable. Time lags are often considered to capture the intrinsic delay among what is observed at different points of the process. In addition, many industrial processes depend on derivative values rather than on the raw values themselves. For example, for one month of sampling data of 10,000 time series that are sampled every minute, with 30 lags per series, the creation of a model would have to consider the combination of 300,000 variables with 43,000 samples, which is a very large problem.

A need exists for improved techniques for evaluating the time series data to provide notifications of alarm conditions within a given plant and to update the associated prediction models, when needed.

SUMMARY

Illustrative embodiments of the present invention provide methods and apparatus for process monitoring based on large-scale combinations of time series data. In one exemplary embodiment, a method comprises the steps of generating one or more multivariate statistical models from time series data for a given target time series; determining whether a first difference between one or more measured values and one or more predicted values based on the one or more multivariate statistical models exceeds a predefined target prediction threshold indicating a target prediction error; in response to a detected target prediction error, performing evaluations of one or more of (i) a neighborhood coherence comprising an average of variables of the one or more multivariate statistical models weighted by corresponding coefficients on a predefined neighborhood time window, and (ii) a second difference between a given value of at least one given variable in the one or more multivariate statistical models and an average value of the at least one given variable in the one or more multivariate statistical models based on a training dataset; providing notifications when first predefined criteria based on the evaluations are satisfied; and updating the one or more multivariate statistical models when second predefined criteria based on the evaluations are satisfied. The method can optionally be processed for only a subset of available variables in an industrial plant.

In one or more embodiments, the first predefined criteria comprise an evaluation of one or more of (i) whether the neighborhood coherence exceeds a predefined neighborhood coherence threshold, (ii) whether the second difference exceeds a predefined process variable threshold, (iii) whether a contribution of one or more variables in the multivariate statistical models diverges from a contribution of other variables having a similar relevance weighting in the multivariate statistical models, and (iv) whether a contribution of one or more variables in the multivariate statistical models diverges from a historical mean of the one or more variables based on the training dataset.

In at least one embodiment, the second predefined criteria comprise a process target difference between one or more measured values and an average value of the process target based on the training dataset exceeding a process target threshold.

In one or more embodiments, the multivariate statistical models are automatically updated when the target prediction error is detected and no notification is provided. The model updating optionally evaluates whether the multivariate statistical models are still valid after the one or more notifications and updates the multivariate statistical models when the multivariate statistical models are invalid according to user input.

Advantageously, illustrative embodiments of the invention provide improved techniques for processing large-scale combinations of time series data. These and other features and advantages of the present invention will become more readily apparent from the accompanying drawings and the following detailed description.

DETAILED DESCRIPTION

Figure 1:
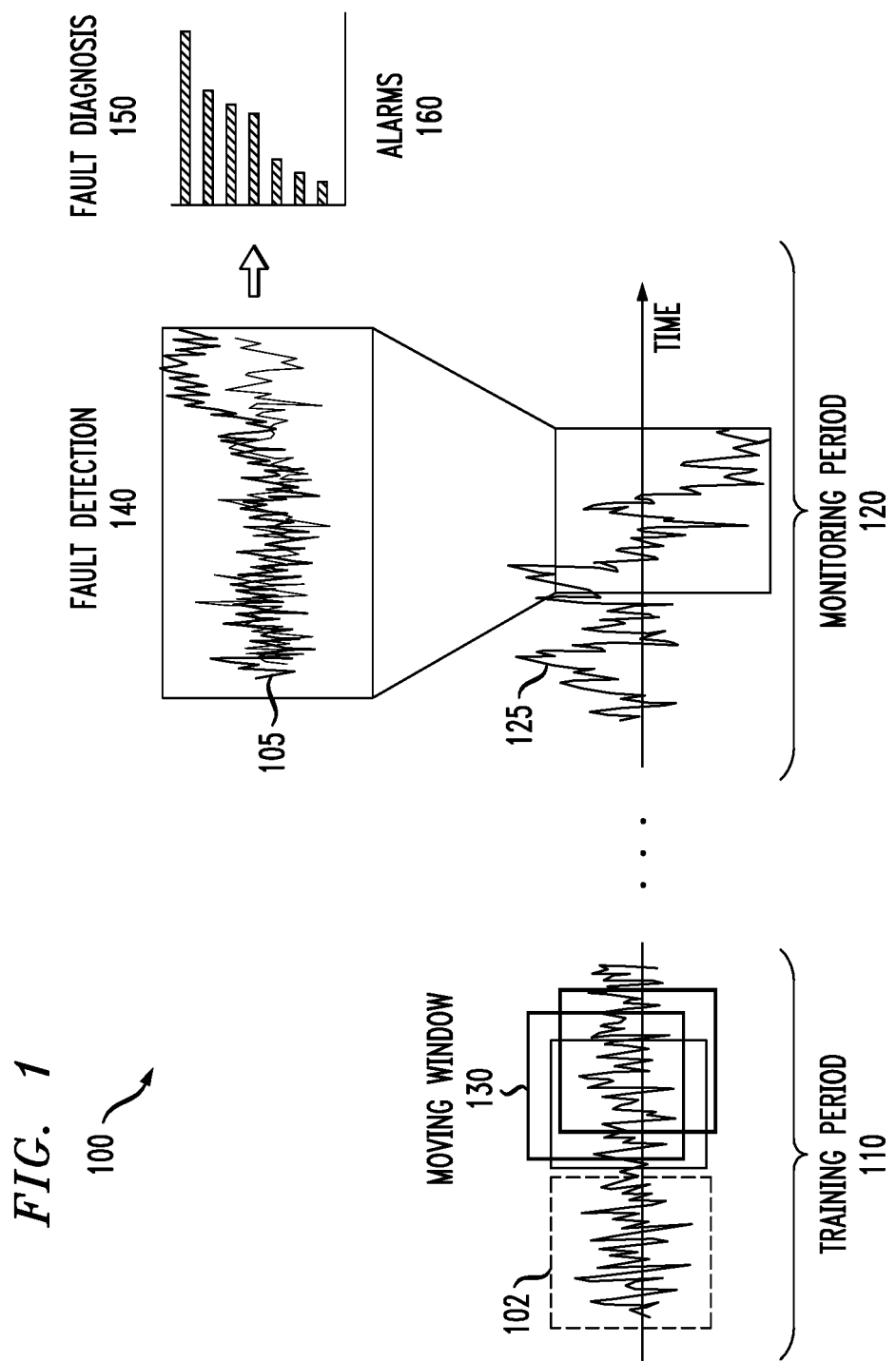
FIG. 1 illustrates an exemplary model creation and monitoring process, according to one embodiment of the invention.

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for process monitoring based on large-scale combinations of time series data. In one or more embodiments, multivariate statistical models are generated from time series data and then predicted values and measured values for the target time series are monitored and compared. If a detachment occurs between the measured values and predicted values, statistical process control methods are applied to diagnose the cause of the detachment. In addition, alarms are optionally triggered to draw the attention of plant operators.

While aspects of the present invention are illustrated in the context of the oil-and-gas industry, the present invention applies in any environment having multiple time series data, potentially with time lags, where one or more of these time series are selected to explain, by a linear model, one particular time series of interest, referred to as a target time series. Each time series, optionally with a time lag, is considered to be a variable in a multivariate linear problem, where the desired model contains one coefficient multiplying each selected variable, and the summation of all selected variables approximates the target variable. Other environments where such a model is useful include, without limitation, finance, economics, security, energy, marketing, and the social sciences, as would be apparent to a person of ordinary skill in the art.

In one or more embodiments, prediction models are generated for a target time series. After a prediction model is generated, one or more embodiments of the invention monitor and compare predicted values and measured values for the target time series. Statistical process control methods are applied to diagnose the cause of a detachment between measured values and predicted values. Alarms are optionally triggered to allow problems to be detected and resolved.

U.S. patent application Ser. No. 15/078,224, filed Mar. 23, 2016, entitled "Massively Parallel Processing (MPP) Large-Scale Combination of Time Series Data," incorporated by reference herein, employs a Massively Parallel Processing procedure that generates prediction models for the target time series. Such prediction models try to capture the set of orthogonal variables that are relevant for the specific target time series during a time window. The disclosed procedure adapts the OMP technique to consider multiple lags and reduce the time to create complex models.

It is noted that real processes are dynamic, as equipment and operation requirements change with time. Thus, the current prediction model should be replaced or updated whenever the current prediction model is no longer useful or accurate. In order to replace the current prediction model, one or more embodiments substantially continuously build alternative models with more recent data so that they can be used, when necessary. In one or more embodiments, a human operator can determine when models should be replaced. This is important due to the fact that when models are unnecessarily changed, the new model might incorporate anomalies. In this case, such anomalies no longer cause any detachment, remaining unnoticed.

In at least one embodiment, an efficient MPP-based model creation procedure is combined with statistical methods to monitor, substantially in real time, plants with many variables. In this way, available information is processed to detect anomalies.

A process may be subject to malfunctions and/or equipment failure, for example, due to unexpected and undesired disturbances, including sudden changes of feed conditions and surrounding environment, inappropriate manipulation of process variables and equipment, and aging of process machinery. The early identification of such problems may allow for the early correction of the process trajectories. This is especially true when the failure results from the slow accumulation of undesired deviations. The result is the possibility of operational gains combined with the avoidance of production losses. Therefore, there are incentives to develop and implement numerical procedures for the on-line monitoring of the process states and early detection of undesired faults.

As industrial processes typically comprise multiple components, disturbances do not necessarily affect the process target immediately. Thus, a holistic view of the process is normally required for proper identification of an existing process fault. Additionally, when the process is not significantly affected by operational disturbances, measurement noise can incorrectly suggest the occurrence of an abnormal process behavior. In this case, it may be difficult to detect if a particular process measurement is corrupted by process operation or instrument failure. Therefore, the proper identification of an existing process fault is an important monitoring objective. In the case of large scale industrial processes, with thousands of variables, there is a need for efficient methods to identify a fault that can be predicted by analyzing the variables.

The early identification of a process malfunction is particularly useful if an operator can correct the process operation in time. In order to do that, it is necessary to identify the causes of the detected fault. Therefore, the proper diagnosis of the process fault and identification of the variable trajectories that must be corrected at the plant is also an important monitoring objective.

In any real multi-dimensional dynamic process, where hundreds to thousands of process variables change simultaneously, as in an oil production platform, it is useful to represent process performance in terms of process targets and performance indices. If alarms are assigned to all variables, there is the risk of triggering too many irrelevant alarms at the same time. In this case, operators will not have their attention focused on the problems that need to be solved. The problem tends to be more complicated when the process is very dynamic and the set of most relevant variables change very often. In this way, it is important to automatically detect and update the set of most relevant variables that should be assigned to alarms.

A plant may function under a new regime or the process may drift when a process fault, instrument failure or equipment malfunction is detected. When a corrective action is applied to the process, the previous process operation condition can be changed. Under the new operating condition, a new prediction model for the target process variable may eventually be needed, so that rebuilding and replacing the target prediction model may be necessary. Therefore, substantially continuous monitoring of model performance is important for model-based applications in one or more embodiments.

The combinatorial explosion associated with the selection of the most relevant independent process variables, and the need to analyze and replace the process model when new operating conditions are visited, require fast and efficient numerical procedures for building process models in time.

In one or more embodiments, OMP linear regression techniques are combined with statistical process control methods. In at least one embodiment, a parallel version of the standard OMP technique (parallel-OMP) is employed to model the process behavior based on data gathered from process sensors, based on parallelization of numerical procedures, described in U.S. patent application Ser. No. 15/078,224, filed Mar. 23, 2016, entitled "Massively Parallel Processing (MPP) Large-Scale Combination of Time Series Data," incorporated by reference herein.

Massive parallelization of the numerical procedure is important, for example, when thousands of dynamic process variables are considered simultaneously, along with delayed time-series data, especially for online applications.

FIG. 1 illustrates an exemplary model creation and monitoring process 100, according to one embodiment of the invention. As shown in FIG. 1, one or more prediction models 105 are created during a training period 110 that process various time lags of time series data 102 in one or more moving windows 130. The creation of the one or more prediction models 105 is discussed further below in conjunction with FIGS. 5 and 6.

Thereafter, during a monitoring period 120, measured time sensor data 125 is compared to values predicted using the one or more prediction models 105. If a detachment occurs between the measured values 125 and predicted values during a fault detection phase 140, alarms 160 are optionally triggered for fault diagnosis. Statistical process control methods can be applied during a fault diagnosis phase 150 to diagnose the cause of the detachment.

A prediction model 105 assumes that a defined process target (y) is a function of other independent measured process variables (including delayed process measurements or lags) represented by X. The process target can be a production variable (such as the total amount of oil produced in an oil platform) or a process index (such as the revenues obtained from the process operation). The resulting model is then used to monitor the time evolution of y, X and the target prediction error $z=y-\hat{y}$, where $\hat{y}$ is the model prediction for the target y. The model 105 is built using a training dataset during the training period 110, which is a historical period (or training period) of observed measurements 102. For the sake of simplicity, all process variables in X are assumed to be normalized according to the training dataset 120. On the other hand, a test dataset 125 is used in the monitoring period 120 when the model 105 is applied on a different time.

The use of the process model 105 thus comprises two distinct steps:

(1) model building during the training period 110, when past process data are used to build the equation:

$$\hat{y}_i = f(X_i),$$

where i indicates the subset of variables in certain time lags in X that was selected by the model. The universe of variables to be investigated and selected is previously specified by the user as well as the a number of time lags that indicates the maximum process lag;

(2) model prediction during the monitoring period 120, when the current set of process measurements ($X_i$) are used to provide a model prediction $\hat{y}_i$ that can be compared to the measured process target y. This prediction is the linear combination of the model variables $x_j$ in $X_i$ weighted by their respective linear coefficients $b_j$. To simplify notation, the coefficients $b_j$ are considered in descending order of their absolute value, i.e. $\forall j, |b_j| \geq |b_{j+1}|$.

The obtained signals captured from the process 100 are then filtered through a series of statistical alarms 160, which can indicate process malfunctions and avoid undesired process faults. The model 105 can be used on-line for continuous analysis of the process condition, in which case the monitoring period 120 of FIG. 1 is the current time and the test dataset 102 is composed of the new appearing data points.

Point-Wise and Long-Term Alarms

Figure 5:
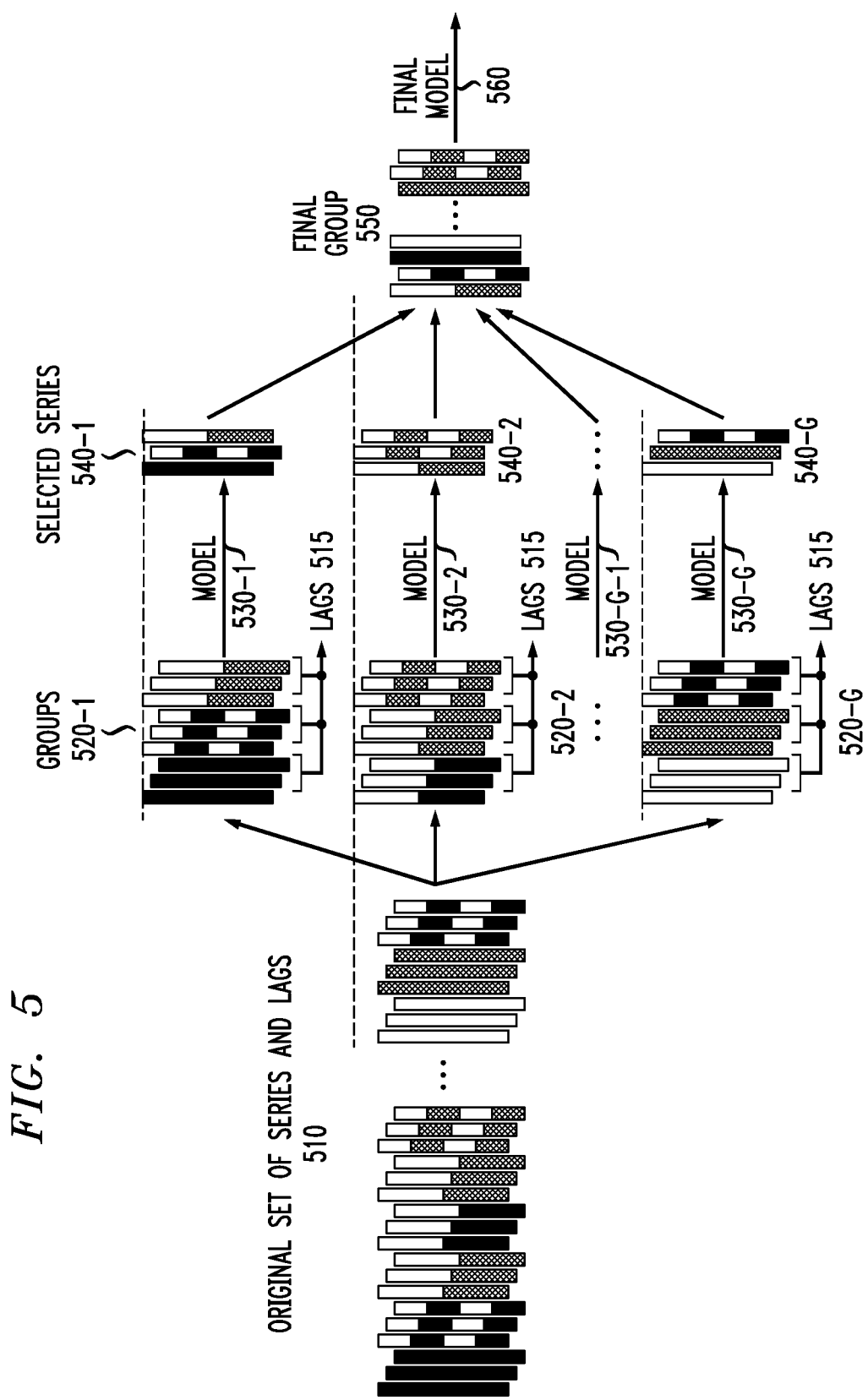
FIG. 5 illustrates an exemplary parallel approach for multivariate regression, according to one embodiment of the invention.

When a model and a list of the most relevant measured process variables (e.g., those variables in $X_i$ selected by the OMP process of FIG. 5) are available, statistical process-control methods can be applied for the identification of an existing process fault. Identification of process faults can be based on the evolution of monitored variables over time, including the process target (y), the selected independent variables ($X_i$) and the target prediction error ($z=y-\hat{y}_i$).

The monitored variables can be evaluated at each sampling instant with the help of different types of alarms, discussed further below. A point-wise detection alarm (Type I) can be applied with a single measured value (e.g., one time instant). A long-term detection alarm (Type II) reflects long-term trends and can detect the existence of bias along a predefined data horizon. A long-term drift detection alarm (Type III) is used in one or more embodiments to detect long-term trends in a specified time series of monitored variable measurements. The long-term drift detection alarm tests the existence of a drift within a window of data points, as reflected by an angular coefficient of a normalized linear fit of the values of the monitored variables in this period.

In an exemplary embodiment, each type of alarm (I-III) is subdivided into four sub-types of alarms I-IV, as follows:

A target prediction alarm (Sub-Type I) is detected based on a difference between measured values and predicted values exceeding a predefined target prediction threshold, indicating a detachment.

A neighborhood coherence alarm (Sub-Type II) is evaluated based on an average of variables of the statistical models weighted by corresponding coefficients on a predefined neighborhood time window, indicating an incoherence.

A selected process variable alarm (Sub-Type III) is evaluated based on a difference between a given value of at least one variable in the statistical models and an average value of the at least one given variable based on a training dataset, indicating that the measured data deviates from the training data.

A process target alarm (Sub-Type IV) is evaluated based on a difference between one or more measured values and an average value of said process target based on said training dataset exceeding a process target threshold. As discussed hereinafter, in the event of a detachment, a process target alarm (Sub-Type IV) can be evaluated to determine if the model needs to be updated.

Point-Wise Detection Alarm (Type I)

The first alarm type is a point-wise detection alarm, which can be applied with a single measured value, as follows:

I. Target prediction error: $|z| < c_z$;
II. Neighborhood coherence: $|x_j b_j - \bar{\eta}_{j,k}| < c_k$;
III. Selected process variables: $|x_j - \bar{x}_j| < c_{x_j}$; and
IV. Process target: $|y - \bar{y}| < c_y$.

where $\bar{x}_j$ is the average of the $x_j$ process variable used to build the model in the training dataset. The neighborhood coherence $\bar{\eta}_{j,k}$ is the average of the model variables weighted by their corresponding coefficients, on a given neighborhood window of size 2k+1 around $x_j$:

$$\bar{\eta}_{j,k} = \sum_{w=1}^{k} \frac{x_{j-w} b_{j-w}}{2k} + \sum_{w=1}^{k} \frac{x_{j+w} b_{j+w}}{2k}$$

The value $\bar{y}$ is the average of the process target in the training dataset, whereas the value z is the difference between the target and its prediction counterpart ($z=y-\hat{y}_i$). Furthermore, $c_z$, $c_k$, $c_{x_j}$ and $c_y$ are confidence limits for each of the monitored variables, generally determined from the statistical properties of the data series used to build the model. For instance, $c_{x_j}=3\sigma_{x_j}$ means the confidence interval is equivalent to three times the standard deviation of $x_j$ in the training dataset.

When one of the point-wise alarms is triggered (i.e., one of the inequalities is not satisfied), there is evidence of a possible fault in the monitored variable. Triggers happen independently, so that several variables can generate different alarms at the same time.

Long-Term Detection Alarm (Type II)

The second alarm is intended to reflect long-term trends and to detect the existence of bias along a pre-defined data horizon. The test is applied in a window containing NJ data points, defined as follows:

I. Target prediction error: $|\bar{z}_{NJ}|<c_z$
II. Neighborhood coherence: $|x_{j,NJ-1}b_j-\bar{\eta}_{j,NJ,k}|<c_k$;
III. Selected process variables: $|\bar{x}_{j,NJ}-\bar{x}_j|<c_{x_j}$; and
IV. Process target: $|\bar{y}_{NJ}-\bar{y}|<c_y$.

where $\bar{x}_{j,NJ}$, $\bar{y}_{NJ}$, and $\bar{z}_{NJ}$ are the average values of the j-th selected process variable, process target, and target prediction error calculated in the window that contains the previous NJ data points. The value $X_{j,NJ-1}$ is the last value in the NJ data points window.

Figures 2, 3:
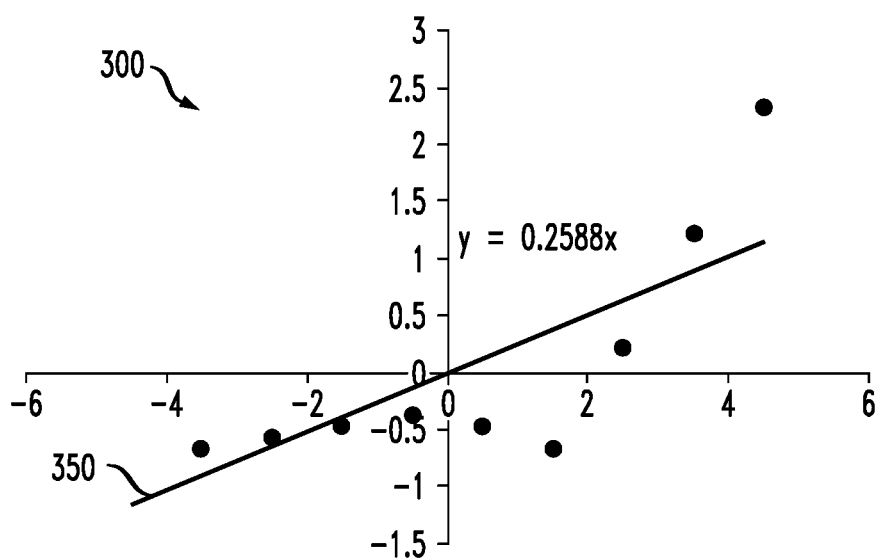
FIG. 2 illustrates an exemplary computation of the neighborhood coherence in a two-dimensional window of data points.
FIG. 3 illustrates a drift, relative to a normalized linear fit, in a time series of a particular window size.

FIG. 2 illustrates an exemplary computation 200 of the neighborhood coherence in a two-dimensional window comprising the NJ data points. Generally, the neighborhood coherence $\bar{\eta}_{j,NJ,k}$ is the average of the model variables weighted by their corresponding coefficients, on a given neighborhood two-dimensional window of size $(2k+1)\times NJ$ around $x_{j,NJ-1}$.

In this scenario, when one of the long-term detection alarms is triggered, there is evidence of a possible fault in the monitored variable in a certain time window. Triggers continue to happen independently, so that several variables in different time windows can generate alarms simultaneously.

Long-Term Drift Detection Alarm (Type III)

The third alarm type also tries to detect long-term trends in a specified time series of monitored variable measurements. The long-term drift detection alarm tests the existence of a drift within a window of NJ data points, as reflected by the angular coefficient of a normalized linear fit of the values of the monitored variables in this period.

FIG. 3 illustrates a drift 300, relative to a normalized linear fit 350, in a time series with a window size, NJ, equal to 10. For the process target (y), the normalized linear fit 350 is represented by the following linear equation and figure:

$$(y_u-\bar{y})=a(u-\bar{u}),$$

where $u=0, \ldots, NJ-1$ is the corresponding position of point $y_u$ inside the window, and $\bar{u}$ is the average value of u. Thus, the coefficient a of the linear equation is determined as follows:

$$\hat{a}=\frac{\sum_{u=0}^{NJ-1}(y_u-\bar{y})(u-\bar{u})}{\sum_{u=0}^{NJ-1}(u-\bar{u})^2}$$

The long-term drift detection alarm test comprises the assessment of the estimated value of a within the following limits:

I. Target prediction error: $|\hat{a}_z|<c_z$;
II. Neighborhood coherence: Not defined for alarm type III;
III. Selected process variables: $|\hat{a}_{x_j}|<c_{x_j}$; and
IV. Process target: $|\hat{a}_y|<c_y$.

The confidence limits $c_{x_j}$, $c_y$, and $c_z$ can be defined in terms of the variance $\sigma_a^2$ that is estimated as the linear coefficient, calculated according to:

$$\sigma_a^2=\frac{\sigma^2}{\sum_{u=0}^{NJ-1}(u-\bar{u})^2},$$

and $$\sigma^2=\sum_{u=0}^{NJ-1}\frac{[(y_u-\bar{y})-a.u]^2}{(NJ-1)}$$

If the absolute value of the linear coefficient violates the proposed limits, there is evidence of a possible fault.

Process Monitoring Method

Figure 4:
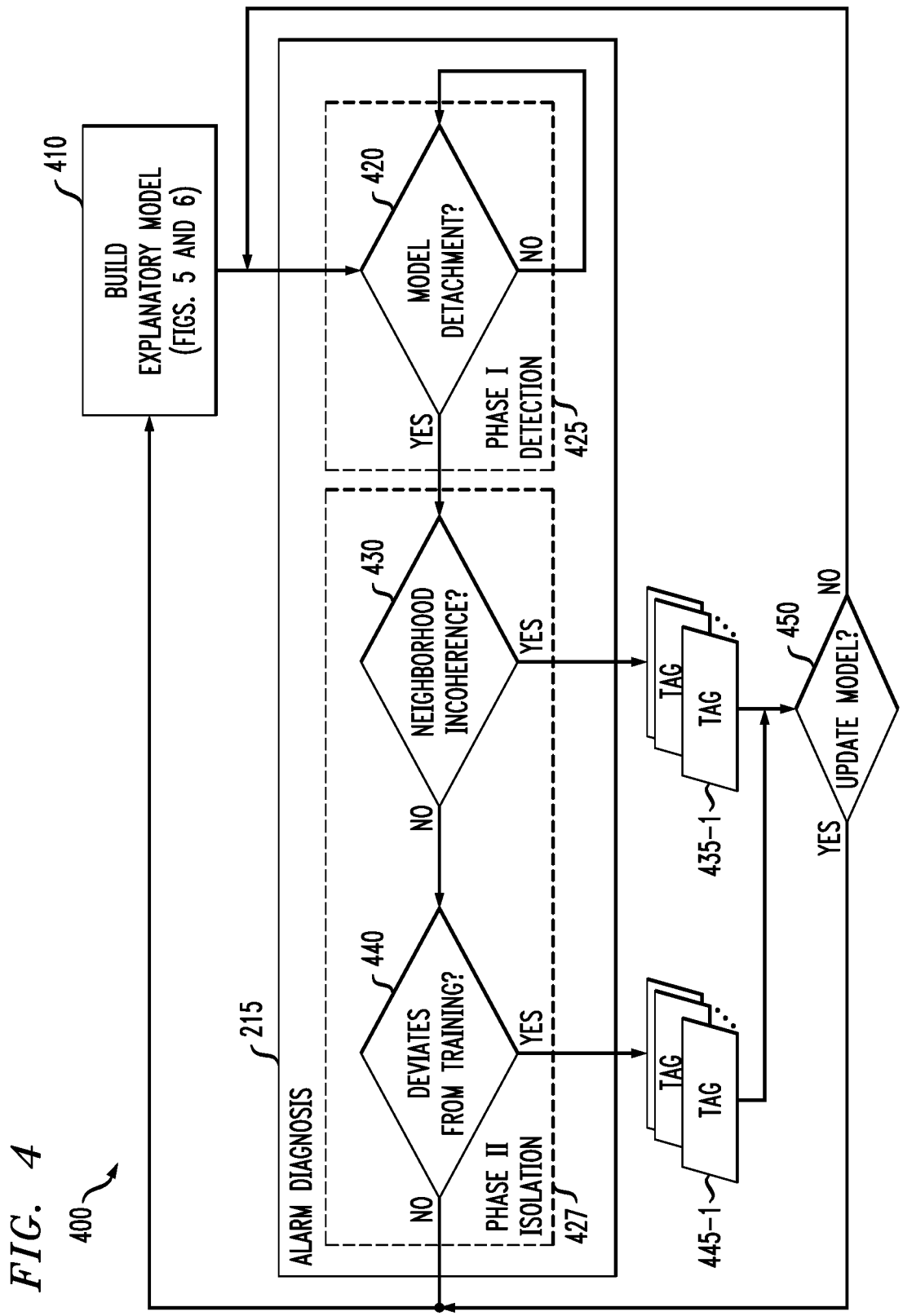
FIG. 4 is a flow chart illustrating an exemplary implementation of a process monitoring method, according to one embodiment of the invention.

FIG. 4 is a flow chart illustrating an exemplary implementation of a process monitoring method 400, according to one embodiment of the invention. Generally, the exemplary process monitoring method 400 combines massive parallel modeling tools and statistical process control methods for continuous process monitoring.

As shown in FIG. 4, the exemplary process monitoring method 400 initially builds an explanatory prediction model during step 410, as discussed further below in conjunction with FIGS. 5 and 6. As noted above, one or more embodiments employ the OMP techniques of U.S. patent application Ser. No. 15/078,224, filed Mar. 23, 2016, entitled "Massively Parallel Processing (MPP) Large-Scale Combination of Time Series Data," incorporated by reference herein, to create the prediction models during step 410 for the target time series. The prediction models capture the set of orthogonal variables that are relevant for the specific target time series during a time window.

Generally, the OMP technique estimates coefficients for each variable selected to predict the process target. In addition, the prediction of the process target is a linear combination of those coefficients and the selected variables, resulting in a contribution term for each variable.

Once the prediction model is obtained, these contribution terms can be used in the fault diagnosis method, represented by the 'Alarm Diagnosis' activity 215. In the alarm diagnosis activity 215, any type of alarm can be used for the sequence of three alarms: point-wise; long-term; or long-term drift.

A test is performed during step 420 as part of a phase I detection 425 to determine if there has been a model detachment. As noted above, a target prediction alarm (Sub-Type I) is detected based on a difference between measured values and predicted values exceeding a predefined target prediction threshold, indicating a detachment.

If it is determined during step 420 that a model detachment has not occured, then program control returns to step 420 to continue monitoring the time series data. If no detachment is detected, the plant processes are considered to be in normal operation and the current prediction model is considered fitting for the explanation of the processes.

If, however, it is determined during step 420 that a model detachment has occured, then the detection indicates that the detachment needs to be further analyzed, and a further test is performed during step 430 as part of a phase II isolation 427 to determine if a neighborhood coherence alarm has been detected. As noted above, a neighborhood coherence alarm (Sub-Type II) is evaluated based on an average of variables of the statistical models weighted by corresponding coefficients on a predefined neighborhood time window, indicating an incoherence.

The detachment between predicted and observed values for a target leads to the statistical analysis of the variables to confirm whether an alarm should be triggered. In this way, alarm flooding is avoided but at the same time all relevant variables can be considered.

If it is determined during step 430 that a neighborhood coherence alarm has been detected, the contribution of one or more variables diverges from the others that are similarly relevant in the model. These diverging variables are highlighted, and one or more tags 435-1 through 435-N are generated indicating one or more problems associated with the incoherence. In one variation, the second alarm tested in step 430 could be replaced by an expert evaluating the contributions of each variable in the model, for example, through a heat map, where each column is a variable $x_i$ and each row is a data point over time. Thereafter, program control proceeds to step 450, discussed below.

If, however, it is determined during step 430 that a neighborhood coherence alarm has not been detected (i.e., the neighborhood coherence inequality is satisfied for all variables), then a further test is performed during step 440 to determine if the measured data deviates from the training data. As noted above, a selected process variable alarm (Sub-Type III) is evaluated based on a difference between a given value of at least one variable in the statistical models and an average value of the at least one given variable based on a training dataset, indicating that the measured data deviates from the training data.

If it is determined during step 440 that the measured data deviates from the training data (i.e., one or more variables differ from their historical mean (in the training period)), their tags 445-1 through 445-N are reported as faulty indicating one or more problems associated with the deviation. Thereafter, program control proceeds to step 450, discussed below.

If it is determined during step 440 that the measured data does not deviate from the training data, then the model is out of date (since a detachment occurred in phase I without being explained in phase II) and program control returns to step 410 to update the model. In other words, a detachment of the model from the target has occurred without concrete explanations from the subsequent alarms (i.e., if no tags 435, 445 were reported as faulty, there is no reason for the model to detach). Thus, the method 440 assumes the model is outdated and builds a new model to explain the target during step 410.

After one or more tags 435, 445 are reported from alarms detected during steps 430 or 440, the method 400 allows for the decision during step 450 of whether to update the model. This decision can be user-based or automated. As noted above, as part of the decision to update the model, process target alarms (Sub-Type IV) can be evaluated based on a difference between one or more measured values and an average value of said process target based on said training dataset exceeding a process target threshold.

The process monitoring method 400 of FIG. 4 can optionally deal with subsets of the entire range of measured variables in the industrial plant, instead of all the variables. Restricting to a subset of variables allows models to be built and monitored based on data obtained from sensors of one or more types (such as pressure transmitters), from one or more areas of the plant site (such as the water treatment area of an oil & gas platform), or from different time intervals for each group of sensors. The result is that multiple process monitoring instances of the method can be used at the same time, providing different points of view for the same industrial process.

As noted above, the exemplary process monitoring method 400 of FIG. 4 builds an explanatory prediction model for the target time series during step 410 using the OMP techniques of U.S. patent application Ser. No. 15/078,224, filed Mar. 23, 2016, entitled "Massively Parallel Processing (MPP) Large-Scale Combination of Time Series Data." The prediction models capture the set of orthogonal variables that are relevant for the specific target time series during a time window.

FIG. 5 illustrates an exemplary MPP approach for multivariate regression. In the example of FIG. 5, groups 520-1 through 520-G (three groups are shown in FIG. 5 for ease of illustration) are specified by a master compute node, based on an original set of m series (and their lags) 510 (nine series are shown in FIG. 5 for ease of illustration, with each distinct series having a different hash pattern). Each exemplary series 510 comprises the data from one sensor and its lags. Each group 520 picks, for example, three series 510 from the original set and considers two lags 515 for each original series. A given series (and its lags) 510 are kept in the same random group 520. The models 530 for the groups 520 are computed substantially in parallel. In the end, the selected series 540 are ranked and selected for the final group 550 (of selected series from all groups 520), which is used to build the final model 560. Each selected series 540 comprises, for example, one original value or a lag for each series in the given group, or one series can be excluded and duplicate values from another series can be included (as in the second selected series 540-2). The parallel execution of the smaller models 530 runs more quickly than a serial implementation and works as a filter to build a final model 560 with the most relevant series 510 without the price of considering too many data as input.

A working compute node in a distributed compute environment processes a corresponding group 520 and performs the selection of the corresponding selected series 540, using the appropriate model 530 (which has been generated by the respective distributed compute node). The final group 550 and the final model 560 are created by the master compute node. Thus, in at least one embodiment, the master compute node orchestrates the series that go into each group 520, and computes the final model 560 from the selected series 540 of each group 520.

Consider n=10,000 series 510 with v=43,200 observations and m=100 lags per series 510. The input matrix of the regression problem is v×m=43,200×1,000,000, which may be prohibitive on a single machine. However, if G is equal to 400 groups 520 that are considered with g equal to 50 series 510 per group 520, there are G input matrices of size v×(g×m)=43,200×5,000. The model 530 in each group 520 can be computed substantially in parallel on distributed compute nodes and, since the input matrix is small, the processing time is relatively short.

In the first stage, each distributed working compute node works with a small subset of time series 510 in the respective group 520. This could potentially reduce the accuracy of the final model 560, since some groups 520 could contain many "good" time series 510 to be part of the model, and some groups 520 could contain "bad" time series 510 to be part of the model. In this case, the ranking mechanism might not select the best time series to explain or predict the target. In one or more embodiments, this potential problem is dealt with by creating the groups randomly, making sure that a specific time series appears in various groups 520. In this way, to have a good ranking and be selected for the second phase 540, the selected time series has to be good enough to beat many time series in different groups 520.

It can be shown that by creating a minimal amount of random groups 520, the OMP algorithm models 560 generated with the disclosed method are as good as those generated with a single instance of the OMP algorithm (which would take much longer to be computed).

In the generated models, the same time series 510 can have multiple coefficients, one for each different time lag 515 (thereby increasing the amount of data to be processed). This is important, in particular, due to the fact that many Physical and Chemical phenomena, for example, depend on derivatives of values measured by sensors (the lags are correlated with derivatives).

The disclosed parallelization of the creation of the models 530 takes care of concentrating all lags 515 of each time series 510 in the same groups. It is important to select just the lags 515 that are most relevant. If the choice of paired series 510 and lags 515 is randomized, highly correlated time series 510 could artificially have more lags 515 selected for the second stage 540. Furthermore, in other groups 520, lags 515 that would be discarded are considered for the second stage 540 because they are not compared to better series 510 since they are not in the same group 520. With a large concentration of lags 515 for the same time series 510 in the second stage 540, the final model 560 could be worse.

When better performance is desired, more working compute nodes can be used to execute the first learning stage 520. In this way, groups 520 can be smaller but redundancy of the inclusion of time series 510 in different groups 520 can improve the accuracy. If it is necessary to improve performance even further, due to the number of time series 510, the procedure can be generalized by creating multiple hierarchical learning stages, as would be apparent to a person of ordinary skill in the art. In this case, there is a plurality of hierarchical learning levels to generate the final model and in each intermediate level of the hierarchy, intermediate compute nodes execute both the roles of master compute node for compute nodes of the lower hierarchical level and working compute nodes for the compute nodes of the upper hierarchical level. Intermediate compute nodes receive selected variables and scores from lower-level compute nodes and perform the following steps: rank the variables; select a pre-defined number of variables based on their scores to be considered as input for the generation of an intermediate linear model using an OMP algorithm; assign a score to each variable of the intermediate model; and provide such variables and their corresponding scores to the upper level in the hierarchy.

In one or more representative embodiments, the OMP algorithm is used to compute the models 530 for each group 520 and the final model 560. The OMP algorithm is executed on each distributed compute node that computes the models 530 for each group 520 and the final model 560.

Figure 6:
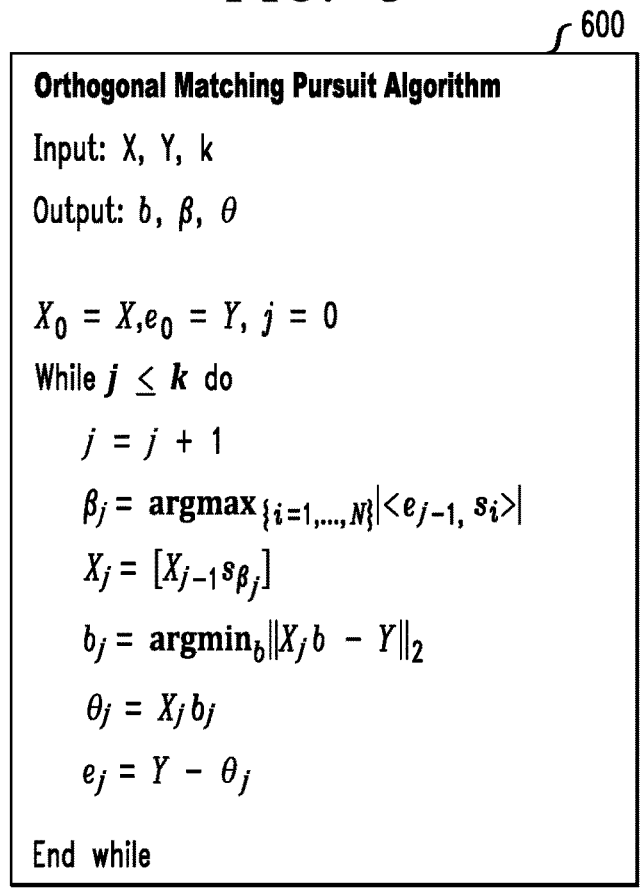
FIG. 6 illustrates exemplary pseudo code for an Orthogonal Matching Pursuit (OMP) algorithm.

FIG. 6 illustrates exemplary pseudo code for the OMP algorithm 600. The OMP algorithm 600 is a greedy algorithm that, on every iteration, j, searches for the series $s_{\beta_j}$ that better explains the residual $e_{j-1}$ between the target Y series and the current explanation $\theta_{j-1}$. The vector $b_j$ of coefficients is updated on each iteration by means of a minimization, in a known manner.

One advantage of the OMP algorithm 600 is that it progressively selects new series 510 that are orthogonal, i.e., linearly independent, from a current explanation. This is useful because many of the input series 510 are linearly dependent on each other. By running the OMP algorithm 600, a set of k almost linearly independent series 510 are obtained which explain the target variable. Nevertheless, the computation of the OMP algorithm 600 for large matrices might take weeks and require huge amounts of physical memory. These restrictions remain if the OMP algorithm 600 is replaced by other regression algorithms, such as Least Angle Regression (LAR) or Least Absolute Shrinkage and Selection Operator (LASSO).

To create the groups 520, a function F is used that randomly selects series 51.0. In the exemplary case with 10,000 series 510, 400 groups 520 and 50 series per group, by picking series 510 randomly, the chances are that they will be part of two or more groups 520. The likelihood increases as the number of groups 520 and series per group are increased. It is noted that increasing the number of groups 520 also increases the degree of parallelism, while increasing the number of series per group makes the computation more complex.

EXAMPLES

The following examples are related to maximization of oil production in an oil platform. The target (oil production) and the process (oil production platform) are illustrative only and do not constrain the scope of the present invention. It is assumed that the rate of oil production depends on operation variables that are related to the dynamic operation of the many vessels and pieces of equipment that constitute the platform. In the following examples, several thousand variables are available at the plant site.

Example 1: Shutdown Detection

Example 1 regards an experimental detection and diagnosis of a plant shutdown using historical data for both training and testing datasets. Process operation data from several thousand variables were gathered. The data time-series were sampled with rate of 1 $min^{-1}$ and new time-delayed variables were generated by applying a lag of 20 sampling instants to each variable. Data from resampled process variables and time-delayed variables corresponding to 30 days of operation (training period) were then used to select the most relevant process variables and to build a model that describes the process target, assumed as the total of the oil production, using the parallel version of the standard OMP technique. Selected variables and model(s) were used to monitor the process behavior during the test period, which corresponds to 15 days after the training period. The following two runs were executed during the test period:

1) Using point-wise alarms, the statistics extracted for this run are: the number of sampling instants a variable is alarmed; and the number of variables alarmed at the same sampling instant.

2) Using long-term alarms, the statistics extracted for this run are: the number of consecutive sampling instants a variable remains alarmed; and the average number of sampling instants the variables are alarmed.

Additionally, these alarms were calculated for two time windows within the test period: the first window comprised the entire test period, while the second window comprised the first 10% of the test period. The first alarm detected a detachment between the target variable and the model prediction. Both second and third alarms detected several variables with known issues, leading to the detection of a major plant shutdown two days in advance.

Fault detection and diagnosis based on the disclosed method also allowed for the identification of an equipment malfunction caused by an external disturbance. The application of the disclosed method to this case study has also provided insight for improvement of the existing control structure in order to prevent similar future events.

Example 2: Monitoring New Operating Conditions

Example 2 refers to the need to update the process and follow this update with previously computed model and alarms. Let the operation condition of a given process be monitored by the disclosed method, thus presenting a process target, a set of selected process variables, a model for the process target and on-line results related to the alarms generated by the monitored variables. Consider the changing of the operation conditions motivated by decisions made by scheduling and planning specialists.

As the new process operating condition is established, the statistical alarms may indicate a deviation from the previous condition. In this case, the deviation might be expected due to the fact that the current model is no longer valid. Furthermore, to resume the capability of monitoring anomalies, the specialist can decide to replace the current model by a new one as soon as there is enough data collected after the stabilization of the new operation condition.

CONCLUSION

Among other benefits, aspects of the present invention generate multivariate statistical models from time series and then monitor and compare predicted values and measured values for the target time series. If a detachment occurs between the measured values and predicted values, statistical process control methods, over selected variables of the prediction model, are applied to diagnose the cause of the detachment. In addition, alarms are optionally triggered to draw the attention of plant operators. In this way, problems can be detected and resolved. Such multivariate statistical models can be employed, for example, in a number of fields, such as finance, economics, security, energy, marketing, and the social sciences.

Improved techniques are provided for monitoring large scale industrial processes. The disclosed techniques are based on the combination of statistical process control methods with linear regression models, specifically those computed by a version of the OMP technique. The resulting models are then used to monitor the evolution of the operation of the plant over time. The signals from the process are filtered through a series of statistical alarms, which can indicate malfunctions and avoid undesired faults. The model can optionally be used online and in real-time for continuous analysis of the process condition. The method allows for the evaluation of the model performance and indicates the possible need to replace the model, due to the occurrence of failures or new operation conditions.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the exemplary computing environment. Such components can communicate with other elements of the system over any type of network or other communication media.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
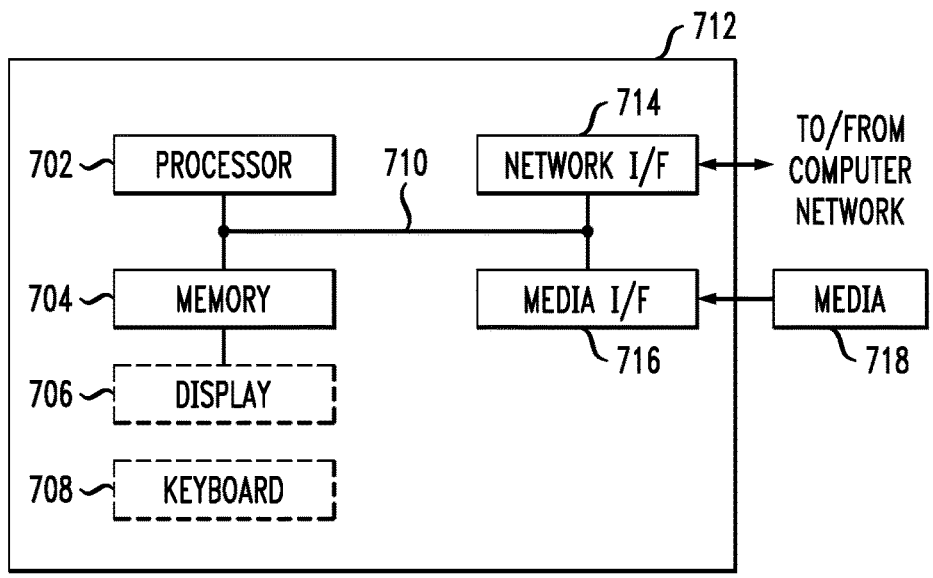
FIG. 7 is a system diagram of an exemplary computer system on which at least one embodiment of the invention can be implemented.

By way of example, an aspect of the present invention can make use of software running on a general purpose computer. FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device (s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved monitoring of industrial processes. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
generating one or more multivariate statistical models from time series data for a given target time series by (a) obtaining a given group of time series data on a given working compute node, wherein said given group comprises one of a plurality of groups of time series data selected from a larger set of time series data; (b) generating a measurement matrix, using said given working compute node, for said given group of time series data based on a plurality of time series selected for said given group and a plurality of time lags of said selected time series; (c) processing, using said given working compute node, said measurement matrix for said given group to generate a first linear model for said given group using an Orthogonal Matching Pursuit algorithm with a predefined number of first independent selected variables, each first independent selected variable corresponding to a specific time series and lag; (d) assigning a score, using said given working compute node, to each of said first independent selected variables based on an order of an absolute value of a coefficient of said first independent selected variable within said linear model of said plurality of time series selected for said given group and said corresponding plurality of time lags; and (e) providing said first independent selected variables and said corresponding assigned scores to a master compute node, wherein said master compute node obtains first independent selected variables and corresponding assigned scores for each of said plurality of groups from a plurality of said working compute nodes; ranks the said first independent selected variables according to said corresponding assigned scores for all of said plurality of groups; selects a predefined number of second independent selected variables based on a final rank to create a final group of time series; and processes said final group of time series to generate a final linear model using said Orthogonal Matching Pursuit algorithm;

determining whether a first difference between one or more measured values and one or more predicted values based on said one or more multivariate statistical models exceeds a predefined target prediction threshold indicating a target prediction error;

in response to a detected target prediction error, performing evaluations of (i) a neighborhood coherence comprising an average of variables of said one or more multivariate statistical models weighted by corresponding model variable coefficients on a predefined neighborhood time window, and (ii) a second difference between a given value of at least one given variable in said one or more multivariate statistical models and an average value of said at least one given variable in said one or more multivariate statistical models based on a training dataset;

providing notifications in response to first predefined criteria based on said evaluations being satisfied; and updating said one or more multivariate statistical models in response to second predefined criteria based on said evaluations being satisfied.

2. The method of claim 1, wherein said first predefined criteria comprise one or more of (i) said neighborhood coherence exceeding a predefined neighborhood coherence threshold, and (ii) said second difference exceeding a predefined process variable threshold.

3. The method of claim 1, wherein said second predefined criteria comprise a process target difference between one or more measured values and an average value of said process target based on said training dataset exceeding a process target threshold.

4. The method of claim 1, wherein one or more of said target prediction error, said neighborhood coherence and said second difference are evaluated for one or more of point-wise detection alarms, long-term detection alarms and long-term drift detection alarms.

5. The method of claim 1, wherein said first predefined criteria comprises an evaluation of whether a contribution of one or more variables in said one or more multivariate statistical models diverges from a contribution of other variables having a similar relevance weighting in said one or more multivariate statistical models.

6. The method of claim 1, wherein said first predefined criteria comprises an evaluation of whether a contribution of one or more variables in said one or more multivariate statistical models diverges from a historical mean of said one or more variables based on said training dataset.

7. The method of claim 1, wherein said step of updating said one or more multivariate statistical models automatically updates said one or more multivariate statistical models when target prediction error is detected and no notification is provided.

8. The method of claim 1, wherein said step of updating said one or more multivariate statistical models includes evaluating whether said one or more multivariate statistical models are still valid after said one or more notifications and updating said one or more multivariate statistical models when said one or more multivariate statistical models are invalid according to user input.

9. The method of claim 1, wherein said method is processed for only a subset of available variables in an industrial plant.

10. A computer program product, comprising a non-transitory machine-readable storage medium having encoded therein executable code of one or more software programs, wherein the one or more software programs when executed perform the following steps:
generating one or more multivariate statistical models from time series data for a given target time series by (a) obtaining a given group of time series data on a given working compute node, wherein said given group comprises one of a plurality of groups of time series data selected from a larger set of time series data; (b) generating a measurement matrix, using said given working compute node, for said given group of time series data based on a plurality of time series selected for said given group and a plurality of time lags of said selected time series; (c) processing, using said given working compute node, said measurement matrix for said given group to generate a first linear model for said given group using an Orthogonal Matching Pursuit algorithm with a predefined number of first independent selected variables, each first independent selected variable corresponding to a specific time series and lag; (d) assigning a score, using said given working compute node, to each of said first independent selected variables based on an order of an absolute value of a coefficient of said first independent selected variable within said linear model of said plurality of time series selected for said given group and said corresponding plurality of time lags; and (e) providing said first independent selected variables and said corresponding assigned scores to a master compute node, wherein said master compute node obtains first independent selected variables and corresponding assigned scores for each of said plurality of groups from a plurality of said working compute nodes; ranks the said first independent selected variables according to said corresponding assigned scores for all of said plurality of groups; selects a predefined number of second independent selected variables based on a final rank to create a final group of time series; and processes said final group of time series to generate a final linear model using said Orthogonal Matching Pursuit algorithm;
determining whether a first difference between one or more measured values and one or more predicted values based on said one or more multivariate statistical models exceeds a predefined target prediction threshold indicating a target prediction error;
in response to a detected target prediction error, performing evaluations of (i) a neighborhood coherence comprising an average of variables of said one or more multivariate statistical models weighted by corresponding model variable coefficients on a predefined neighborhood time window, and (ii) a second difference between a given value of at least one given variable in said one or more multivariate statistical models and an average value of said at least one given variable in said one or more multivariate statistical models based on a training dataset;
providing notifications in response to first predefined criteria based on said evaluations being satisfied; and
updating said one or more multivariate statistical models in response to second predefined criteria based on said evaluations being satisfied.

11. The computer program product of claim 10, wherein said first predefined criteria comprise one or more of (i) said neighborhood coherence exceeding a predefined neighborhood coherence threshold, and (ii) said second difference exceeding a predefined process variable threshold.

12. The computer program product of claim 10, wherein said second predefined criteria comprise a process target difference between one or more measured values and an average value of said process target based on said training dataset exceeding a process target threshold.

13. The computer program product of claim 10, wherein said first predefined criteria comprises an evaluation of one or more of (i) whether a contribution of one or more variables in said one or more multivariate statistical models diverges from a contribution of other variables having a similar relevance weighting in said one or more multivariate statistical models, and (ii) whether a contribution of one or more variables in said one or more multivariate statistical models diverges from a historical mean of said one or more variables based on said training dataset.

14. The computer program product of claim 10, wherein said step of updating said one or more multivariate statistical models includes evaluating whether said one or more multivariate statistical models are still valid after said one or more notifications and updating said one or more multivariate statistical models when said one or more multivariate statistical models are invalid according to user input.

15. A system, comprising:
a memory; and
at least one hardware device, coupled to the memory, operative to implement the following steps:
generating one or more multivariate statistical models from time series data for a given target time series by (a) obtaining a given group of time series data on a given working compute node, wherein said given group comprises one of a plurality of groups of time series data selected from a larger set of time series data; (b) generating a measurement matrix, using said given working compute node, for said given group of time series data based on a plurality of time series selected for said given group and a plurality of time lags of said selected time series; (c) processing, using said given working compute node, said measurement matrix for said given group to generate a first linear model for said given group using an Orthogonal Matching Pursuit algorithm with a predefined number of first independent selected variables, each first independent selected variable corresponding to a specific time series and lag; (d) assigning a score, using said given working compute node, to each of said first independent selected variables based on an order of an absolute value of a coefficient of said first independent selected variable within said linear model of said plurality of time series selected for said given group and said corresponding plurality of time lags; and (e) providing said first independent selected variables and said corresponding assigned scores to a master compute node, wherein said master compute node obtains first independent selected variables and corresponding assigned scores for each of said plurality of groups from a plurality of said working compute nodes; ranks the said first independent selected variables according to said corresponding assigned scores for all of said plurality of groups; selects a predefined number of second independent selected variables based on a final rank to create a final group of time series; and processes said final group of time series to generate a final linear model using said Orthogonal Matching Pursuit algorithm;

determining whether a first difference between one or more measured values and one or more predicted values based on said one or more multivariate statistical models exceeds a predefined target prediction threshold indicating a target prediction error;

in response to a detected target prediction error, performing evaluations of (i) a neighborhood coherence comprising an average of variables of said one or more multivariate statistical models weighted by corresponding model variable coefficients on a predefined neighborhood time window, and (ii) a second difference between a given value of at least one given variable in said one or more multivariate statistical models and an average value of said at least one given variable in said one or more multivariate statistical models based on a training dataset;

providing notifications in response to first predefined criteria based on said evaluations being satisfied; and updating said one or more multivariate statistical models in response to second predefined criteria based on said evaluations being satisfied.

16. The system of claim 15, wherein said first predefined criteria comprise one or more of (i) said neighborhood coherence exceeding a predefined neighborhood coherence threshold, and (ii) said second difference exceeding a predefined process variable threshold.

17. The system of claim 15, wherein said second predefined criteria comprise a process target difference between one or more measured values and an average value of said process target based on said training dataset exceeding a process target threshold.

18. The system of claim 15, wherein said first predefined criteria comprises an evaluation of one or more of (i) whether a contribution of one or more variables in said one or more multivariate statistical models diverges from a contribution of other variables having a similar relevance weighting in said one or more multivariate statistical models, and (ii) whether a contribution of one or more variables in said one or more multivariate statistical models diverges from a historical mean of said one or more variables based on said training dataset.

19. The system of claim 15, wherein said step of updating said one or more multivariate statistical models includes evaluating whether said one or more multivariate statistical models are still valid after said one or more notifications and updating said one or more multivariate statistical models when said one or more multivariate statistical models are invalid according to user input.

20. The system of claim 15, wherein one or more of said target prediction error, said neighborhood coherence and said second difference are evaluated for one or more of point-wise detection alarms, long-term detection alarms and long-term drift detection alarms.

\* \* \* \* \*